United States Patent [19]

Takano

[11] 4,276,039
[45] Jun. 30, 1981

[54] ADJUSTLESS V-BELT AND METHOD OF MANUFACTURING

[75] Inventor: Hiroshi Takano, Miki, Japan

[73] Assignee: Mitsuboshi Belting Ltd., Kobe, Japan

[21] Appl. No.: 35,675

[22] Filed: May 3, 1979

[51] Int. Cl.³ .............................................. F16G 5/08
[52] U.S. Cl. ...................................... 474/205; 474/267
[58] Field of Search ................... 74/233, 234, 231 C, 74/232, 231 R, 231 CB; 198/844, 847; 474/204, 205, 266, 267

[56] References Cited

U.S. PATENT DOCUMENTS

| | | | |
|---|---|---|---|
| 2,024,443 | 12/1935 | Freedlander | 74/233 |
| 2,727,844 | 12/1955 | Adams, Jr. | 74/232 |
| 2,739,090 | 3/1956 | Waugh | 74/233 X |
| 2,831,359 | 4/1958 | Carle | 74/233 |
| 3,566,706 | 3/1971 | Fix | 74/233 |
| 3,872,735 | 3/1975 | Hnatek | 74/231 R |
| 4,096,764 | 6/1978 | Richmond et al. | 74/233 |

Primary Examiner—C. J. Husar
Assistant Examiner—Conrad Berman
Attorney, Agent, or Firm—Sughrue, Rothwell, Mion, Zinn and Macpeak

[57] ABSTRACT

An adjustless V-belt and method of manufacturing the same is disclosed. The power transmitting belt automatically absorbs and adjusts its elongation to maintain constant tension.

15 Claims, 15 Drawing Figures

ADJUSTLESS V-BELT AND METHOD OF MANUFACTURING

BACKGROUND OF THE INVENTION

This invention relates to an adjustless V-belt and a method of manufacturing the same. More particularly, the term adjustless V-belt means a belt which automatically absorbs and adjusts its elongation which may be caused during operation, to maintain the tension constant. This invention also relates to a method of manufacturing the V-belt.

Wrapping connector driving belts such as flat belts, V-belts, and poly-V-belts serve, in general, to transmit power through the frictional force thereof. Accordingly, the belt requires tension predetermined according to the driving conditions. If the belt is elongated and the tension is decreased during use, then the force of the belt gripping the pulley is decreased. As a result, the belt slips. If the belt slips in this manner, then heat is generated in the belt, and the belt is further elongated while the degree of slip of the belt is further increased. Finally, the belt may fail prematurely by the heat generated therein. Accordingly, in order to improve the durability of the belt, it is necessary to provide a belt which is not significantly elongated and can maintain a tension higher than a threshold value at which slip is caused.

Recently, a technical concept has been studied in which a rope having large thermal contraction stress, such as a synthetic fiber rope made of, for instance, polyester fibers, is used as the tensile member of a belt, so that, when heat is generated in the belt to elongate the latter, the tensile member reacts quickly with the generation of heat in the belt to contract the belt. This tends to suppress the elongation of the belt. During a series of belt manufacturing processes, before the belt molding process, the thermal elongation treatment of the rope tensile member is extensively carried out in order to reduce the elongation of the rope tensile member. However, since the degree of thermal elongation treatment for the synthetic fiber rope is increased, the thermal contraction stress is increased during vulcanization.

Accordingly, when the synthetic fiber rope spirally wound on a cylindrical drum or a metal mold through a rubber layer not yet vulcanized is subjected to vulcanization, then the rope tensile member is contracted by the contraction stress. As a consequence, it is dropped into the rubber layer, and the contraction stress is reduced. Thus, the resultant belt is high in elongation. At worst, the rope tensile member in the rubber layer is disturbed, and it is difficult to maintain the pitch line of the rope tensile member uniform.

The above-described drawbacks accompanying a conventional method of manufacturing a rubber V-belt or a V-belt with cogs, and secondary difficulties which are involved in countermeasures effected to eliminate the drawbacks will be described with reference to FIGS. 1 through 5. These figures all disclose prior art techniques.

As shown in FIG. 1, a few plys of rubberized convas 24 are wound around a cylindrical metal mold 21 or a metal mold (not shown) on the outer wall of which protrusions are formed. A compressive rubber sheet 22 and an adhesion rubber sheet 23a which are not vulcanized yet are laminated on the rubberized canvas layer 24. Then, a rope tensile member 26 made of polyester fibers having a high thermal contraction stress is wound spirally on the adhesion rubber sheet 23a. Thereafter, an adhesion rubber layer 23b not yet vulcanized and a few plys of rubberized canvas 25 are wound on the rope tensile member 26 in succession, to form an assembly. Then, a molded belt blank is obtained by externally pressurizing and heating the assembly. Thereafter, the molded belt blank is cut into a plurality of rings to provide V-belts.

In this method of manufacturing V-belts, the rope tensile member 26 is embedded in the adhesion rubber layers 23b and 23a as the latter flows. However, the amount of rubber flowing between the parts of the rope tensile member spirally wound is very small, and the degree of friction obtained by the flow of rubber is therefore small. Thus, it is difficult to activate the surface of the rope tensile member 26. Since various blending chemicals and softeners are mixed in the adhesion rubber layers 23b and 23a not yet vulcanized, chemicals lowering the adhesion property are actuated. Therefore, the surfaces of the adhesion rubber layers 23b and 23a have unsatisfactory adhesion properties.

Hence, in combination with the rope tensile member 26 having the inert surface, it becomes difficult to bond the rope tensile member to the adhesion rubber layers 23a and 23b. Furthermore, since the rope tensile member 26 having the thermal contraction characteristic is wound on the flexible rubber layer not yet vulcanized, the rope tensile member is contracted during vulcanization. As a result, it drops as indicated by the arrows (FIG. 1) in the adhesion rubber layer 23a and the compressive rubber layer 22 below the rope tensile member. Thus, as shown in FIG. 2, the arrangement of the parts of the rope tensile member 26, i.e., the pitch line thereof becomes irregular. Accordingly, tension is non-uniformly applied to the parts of the rope tensile member 26. This tends to cause the belt to be broken prematurely.

In order to eliminate the above-described difficulty where the tensile member drops into the rubber layer by the thermal contraction, a prior art method may be employed in which, as shown in FIG. 3, a reinforcing canvas 28 is provided below the rope tensile member 26 to prevent the rope tensile member from dropping in the rubber layer. In this case, the rope tensile member 26 embedded in the adhesion rubber layer 23 is dropped in the lower parts of the adhesion rubber layer 23, to be brought into contact with the reinforcing canvas 28. Therefore, the reinforcing canvas may separate the belt into layers.

Shown in FIG. 4 is a reversal molding method. An upper rubberized canvas 25, an adhesion rubber layer 23, a rope tensile member 26, a compressive rubber layer 22 and a lower rubbered canvas 24 are wound on a metal mold 21 in succession to form an assembly. A molded belt blank is formed by pressurizing and heating the assembly, and then the molded belt blank is cut into a plurality of rings, which are turned inside out to provide the desired belts. In this conventional method, it is difficult to prevent the rope tensile member from dropping into the rubber layer. That is, the rope tensile member 26 is caused to drop into the adhesion rubber layer 23 as indicated by the arrows. As a result, the rope tensile member 26 is brought into contact with the upper rubberized canvas 25 as shown in FIG. 5. Thus, also in this case, the above-described difficulties may result with respect to the surface where the tensile member is provided.

As is apparent from the above description, in the above-described various prior art methods, no rubber layer is provided between the tensile member and the reinforcing canvas or the upper rubberized canvas, i.e., the tensile member is in direct contact with the canvas. Therefore, the adhesion property of the rope tensile member is lowered. Thus, the tensile member is liable to peel off during operation of the belt. Thus, the conventional methods described above are still disadvantageous for a variety of reasons.

The method according to this invention comprises the steps of:

(1) winding a longitudinally stretchable cover canvas around a metal mold on the outer wall of which strip-like protrusions and grooves are alternately provided;

(2) spirally winding rope tensile members subjected to thermal elongation around the cover canvas, the rope tensile member having a large thermal contraction stress of at least 3.5 g/denier which is the difference between a thermal contraction stress at 100° C. and that at room temperature;

(3) winding an adhesion rubber sheet on the rope tensile members;

(4) winding a compressive rubber sheet containing short fibers laterally arranged, around the adhesion rubber sheet, thereby to form a molded belt blank;

(5) placing a cylindrical mold in the inner wall of which a group of cogs are formed over the molded belt blank; and (6) heating and pressurizing said molded belt blank to permit a part of the adhesion rubber sheet to flow to fill the grooves of the metal mold, and to permit a part of the compressive rubber sheet to flow to fill the grooves of said cylindrical mold, to form either two groups of cogs on the upper and lower surfaces of said molded belt blank, respectively, or a group of cogs covered with the cover canvas on the surface of the compressive rubber layer.

SUMMARY OF THE INVENTION

Accordingly, an object of this invention is to eliminate all of the above-described difficulties accompanying a conventional rubber V-belt.

It is another object of this invention is to provide a method of manufacture of V-belt eliminating the defects of the prior art.

Provided, according to the invention, is an adjustless V-belt comprising a compressive rubber layer made of a heatproof or coldproof synthetic rubber and an adhesion rubber layer laminated on the compressive rubber layer. A group of cogs protrude from the adhesion rubber layer and extend in the direction of width of the V-belt, the cogs having a predetermined depth and arranged at a predetermined pitch. A stretchable cover canvas covers the cogs and the roots between the cogs and rope tensile members are embedded between the adhesion rubber layer and the group of cogs with a regular pitch line in such a manner that the tensile members form a cylinder and parts of the tensile members are in contact with the cover canvas. The rope tensile members have a high thermal contraction stress of at least 3.5 g/denier which is the difference between a thermal contraction stress at 100° C. and that at room temperature. Short fibers are embedded laterally in the compressive rubber layer and a group of cogs formed on the lower surface of the belt improve the bending characteristic of the lower surface of the belt. Thus, an adjustless V-belt having two groups of cogs on both surfaces thereof is provided by the invention.

An adjustless V-belt according to the invention will be described with respect to the drawings and the description of the preferred embodiment that follow.

DESCRIPTION OF THE PREFERRED EMBODIMENTS

Figure 7:
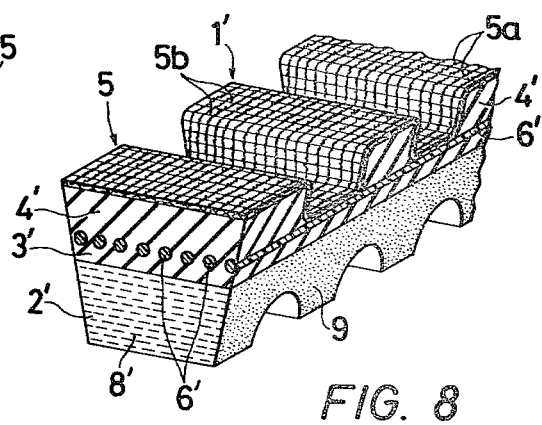
FIGS. 7 and 8 are perspective views showing parts of two examples of an adjustless V-belt according to this invention, respectively.
Figure 13:
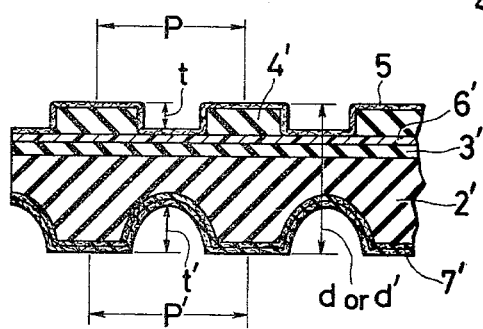
FIG. 13 is a side view of a part of the V-belt having equal pitch cog.

In FIG. 7, reference numeral 1' designates a V-belt body. The V-belt body 1' comprises a compressive rubber layer 2' made of a heatproof synthetic rubber comprising a single material or CR rubber or NBR rubber or contained by blending these rubbers. Alternatively, it may be a coldproof rubber obtained by blending NR rubber and SBR rubber, or CR rubber and BR rubber. In both cases an adhesion rubber layer 3' or 60°–80° (Shore hardness) made of the same material as that of the compressive rubber layer 2' is employed laid over the compressive rubber layer 2, to give a lateral rigidity to the V-belt body. A group of cogs 4' are formed on the surface of the adhesion rubber layer 3' in such a manner that the group of cogs 4' spread in the direction of width of the belt and protrude from the surface of the adhesion rubber layer 3 at a predetermined pitch and with a predetermined depth. In this connection, the pitch (p) of the cogs 4' and the depth (t) of each cog are defined as follows with respect to the thickness (d) of the belt: (see FIG. 13)

$1.5t < p < 3.5t$ $0.21d < t < 0.4d$

If the pitch (p) of the cogs 4' is less than 1.5t, then the configuration of the top part of each cog is elongated and therefore the lateral rigidity of the belt is reduced. As a result, the cogs may be broken and scattered during the run of the belt. If the pitch (p) is more than 3.5t, then in the case where a rope tensile member is wound around the protrusions of a metal mold in forming a belt, the section of the rope becomes polygonal. Therefore, the belt pitch line on a pulley is pulsated during the run of the belt, which results in the vibration of the belt and the generation of heat therein. Thus, the pitch (p) should be in the range defined as above ($1.5t < p < 3.5t$).

On the other hand, if the depth(t) of the cog is less than 0.12d, then the thickness of the cog 4' is reduced as much and the reinforcement effect of the cog section with respect to the rope tensile member is also decreased. This affects the service life of the belt. More specifically, the belt is curved or deformed in a lateral direction. As a result, the belt is caused to fall into the groove of the V-pulley and, accordingly, stress is concentrated only to the tensile members in the peripheral portion of the belt. Thus, the service life of the belt is reduced. If, in contrast, the depth (t) of the cog 4' is increased to be larger than 0.4d, then the pitch line of the rope tensile members is lowered, the number of effective rope tensile members and the effective transmission area thereof are decreased, and the belt transmission force is reduced. Thus, the depth (t) of the cog 4' should be in the range defined as above ($0.12d < t < 0.4d$).

Figure 6:
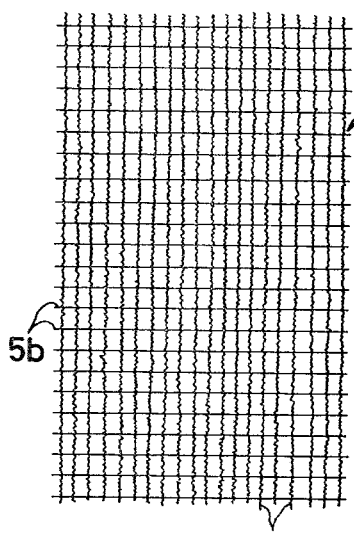
FIG. 6 is a plan view showing a part of a nylon cover canvas employed for a V-belt according to this invention.

The cogs and the roots between the cogs are covered with a sheet of cover canvas 5 made frictional with heatproof synthetic rubber or coldproof rubber which is similar to the materials of the above-described rubber layers 2' and 3'. The cover canvas 5 is elastic (expanding and contracting) only in the longitudinal direction. The cover canvas 5 is obtained by weaving curled nylon warps 5a subjected to woolly treatment and ordinary nylon wefts 5b as shown in FIG. 6. The stretchable warps 5a are arranged in the longitudinal direction of the belt so that the belt can be sufficiently bent in the longitudinal direction, while the ordinary nylon wefts 5b make the belt rigid in the direction of width of the belt.

In FIG. 7, reference character 6' designates tensile members made of polyester fibers or polyamide fibers. The surfaces of the tensile members 6' are subjected to adhesion treatment with an isocyanate group liquid or RFL liquid and is heat-set at 200° C. so that the tensile members have a thermal contraction characteristic of at least $\Delta E_{100-20} = 3.5$ g/denier, the difference between the thermal contraction stress at 100° C. and that at 20° C. The tensile members 6' are spirally disposed between the rubber layer 3' and the cogs 4'. More specifically, the tensile members 6' are embedded along the surface of a phantom cylinder and with a regular pitch line in the rubber layer 3' in such a manner that parts of the tensile members 6' are in contact with the aforementioned cover canvas 5 at the roots between the cogs. That is, the belt is constructed so that, due to the fact that the thermal contraction characteristic of the rope tensile members is at least $\Delta E_{100-20} = 3.5$ g/denier, a thermal contraction stress is provided against heat generated during the run of the belt.

In FIG. 7, reference numeral 2' designates a compressive rubber layer made of heatproof or coldproof rubber similar to the material of the above-described rubber layer 3'. In the rubber layer 2', 10 to 30 parts by weight of various short fibers 8' with respect to 100 parts by weight of rubber are embedded therein laterally in order to improve the wear resistance of the belt and the durability against a pressure applied to the sides of the belt (hereinafter referred to as "a side pressure durability"). On the lower surface of the rubber layer 2', a group cogs 9 are formed a predetermined pitch, the cogs 9 being not covered with canvas. The pitch (p') and depth (t') of the cogs 9 are defined as follows, with respect to the thickness (d') of the belt: (see FIG. 13)

$1.5t' < p' < 3.5t'$
$0.25d' < t' < 0.5d'$

If the cog pitch (p') on the lower surface of the belt is less than 1.5t', then the configuration of the cog 9 becomes necessarily small. As a result, the side pressure durability is reduced during operation of the belt. If the cog pitch (p') is larger than 3.5t', then the section of the belt is liable to be made polygonal when the belt is bent on the pulley, which may crack the cogs. Therefore, the cog pitch (p') should satisfy the above-described condition ($1.5t' < p' < 3.5t'$).

The cog depth (t') should be more than 2.5d' in order to increase the bending resistance. If the cog depth (t') is more than 0.5d', then the bending resistance with respect to the pulley is reduced. However, in this case, the side pressure durability is described, thus reducing the durability of the belt. Thus, the cog depth (t') should meet the above-described condition ($0.25d' < t' < 0.5d'$).

With the V-belt constructed as described above according to the invention, various problems such as the contraction stress at the time of heat generation, elasticity of the upper and lower surfaces of the belt, bending resistance, side pressure durability, and wear resistance can be solved.

The V-belt having the cogs on the lower surface thereof is bendable when compared with a V-belt having no cogs on the lower surface thereof. Therefore, the former V-belt can be used with a pulley of small diameter, which may result in a compact design. However, the former V-belt is still disadvantageous in the following points: When the belt inserted into the pulley is removed therefrom, it is difficult to pull the cogs out of the pulley. That is, the cogs are forcibly pulled out and as a consequence the belt squeaks. As the coefficient of friction of the cogs is increased, it becomes more difficult to pull the cogs out of the pulley, and the level of belt squeak increases. As this is repeated cyclically, disturbing noises are caused during the run of the belt. For instance, a V-belt for an automobile is advantageous in that it can use a pulley of small diameter, but it can not readily be used for a truck or a bus.

In order to solve the problem of noise described above, in the V-belt according to the invention, the entire surface of the cogs 9 on the lower surface of the belt is covered with a single or plural plys (preferably of 2-5 plys) of rubberized bias canvas 7' of cotton threads or it is covered with laminated rubberized canvas which is obtained by weaving the curled nylon wraps 5a and the ordinary nylon wefts 5b as shown in FIG. 6 so that it can stretch only in the longitudinal direction of the belt. The V-belt thus constructed can be readily pulled out of the pulley. That is, with the canvas having a low coefficient of friction, slipping of the belt is reduced, thereby to decrease the noise. Since the slip between the canvas and the pulley is great, the concentration of stress to the grooves in the lower part of the belt can be avoided, and therefore it is possible to protect the belt from being cracked.

In the above-described example of the V-belt according to the invention, the pitch of the cogs 9 formed in the lower surface of the belt is constant, and the noise can be eliminated to an extent during the run of the belt. However, since the cogs are provided at equal intervals, the belt squeaks periodically when pulled out of the pulley, and therefore the effect of preventing the noise is not as high as expected.

Figure 9:
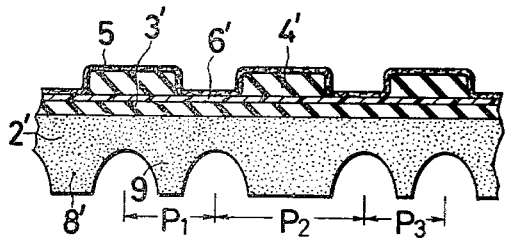
FIG. 9 is a side view of a part of the V-belt shown in FIG. 7, which is modified so that the cogs of the belt are arranged at random pitches.
Figure 10:
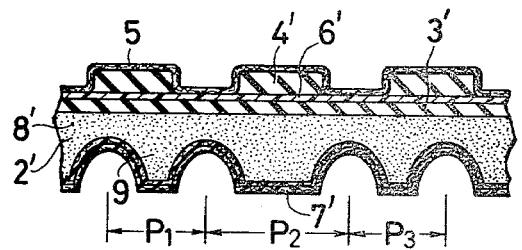
FIG. 10 is a side view of a part of the V-belt shown in FIG. 8, which is modified so that the cogs of the belt are arranged at random pitches.

In order to further reduce the noise, the V-belt of the invention is modified so that the pitch of the cogs on the lower surface of the belt is random as shown in FIGS. 9 and 10.

FIGS. 9 and 10 are side views showing parts of the V-belts in which the cog pitches are random. In the V-belt shown in FIG. 9, the cogs are not covered with canvas, and the pitches $p_1$, $p_2$ and $p_3$ are different from one another. In the V-belt shown in FIG. 10, the pitches $p_1$, $p_2$ and $p_3$ of the cogs are different from one another as in FIG. 9, but the cogs are covered with a single or plural layers of rubberized bias canvas 7' made of cotton thread similar to the canvas covering the cogs having the constant pitch as in FIG. 8. Alternatively, they are covered with a single or plural layers of rubberized canvas obtained by weaving curled nylon warps $5a$ subjected to woolly treatment and ordinary nylon wefts $5b$ to stretch only in the longitudinal direction of the belt.

Since the pitches of the cogs on the lower surface of the belt are different from one another (random) as described above, the cogs are depressed non-uniformly into the pulley when the belt is driven. As a result, the belt will squeak randomly when pulled out of the pulley, and accordingly the timing of generation of noise is dispersed, or the noise is generated intermittently. Thus, the noise is reduced.

The coefficient of friction is reduced by providing the laminated canvas over the cogs disposed at random intervals. That is, the slip between the belt and the pulley is improved to further reduce the squeaky sound caused when the belt is pulled out of the pulley.

The pitches (p') of the cogs should be made random in the above-described condition ($1.5t' < p' < 3.5t'$) in view of the side pressure durability and bending characteristic of the belt. Preferably, the range is in the order of 5 to 10 mm.

As is apparent from the above description, the V-belt according to the invention, is provided with the cogs not only on the upper surface of the belt but also the lower surface. The compressive rubber layer 2' and the adhesion rubber layer 3' which form the belt body are made of CR rubber or NBR rubber excellent in heat resistance, or a blend rubber such as NR-SBR rubber or CR-BR rubber in order to protect the belt from being hardened or deteriorated in cold areas. Therefore, the V-belt, according to the invention, can be effectively employed for equipment such as an automobile in which heat is generated when the belt is driven at high rate. The rope tensile members are made of polyester fibers or polyamide fibers, excellent in thermal contraction characteristic, and therefore when heat is generated as the belt is run at high speed or bent repeatedly or when heat is generated by the slip of the belt, the tensile members contract sufficiently. As a result, unlike the conventional V-belt, it is unnecessary to repeatedly adjust the tension of the V-belt. That is, the V-belt according to the invention is automatically tightened.

The cogs having the predetermined constant pitch and constant depth are formed on the upper surface of the belt. As a result, the bending characteristic of the belt is improved. Furthermore, the cogs are covered with the canvas which can stretch only in the longitudinal direction of the belt, and therefore the bending characteristic of the belt is further improved.

The canvas is made of ordinary nylon threads high in rigidity in the lateral direction, the adhesion rubber layer is higher in hardness than an ordinary adhesion rubber layer, and a number of short fibers are embedded laterally in the compressive rubber layer. Therefore, the rigidity in the lateral direction of the belt is increased so that the belt is not deformed when inserted into the pulley. The cogs on the upper surface of the belt are covered with a single play of stretchable canvas to prevent the belt from being deformed in the lateral direction. The rope tensile members are embedded in the adhesion rubber layer in such a manner that parts of the tensile members are in contact with the cover canvas. This prevents local fatigue of the belt.

The cover canvas is made frictional with the same rubber as that of the belt body, and therefore the adhesion of the cover canvas is improved. Some parts of the rope tensile members are covered by the cover canvas, while some parts of the rope tensile members are completely embedded below the cogs, to positively prevent the tensile members from being peeled off the belt body.

The cogs are provided at equal intervals or at unequal intervals on the lower surface of the belt. Accordingly, the bending characteristic of the lower surface of the belt is improved, and the belt can be used with a pulley of small diameter. A single ply or plural plys of rubberized bias canvas or rubberized canvas stretchable in the longitudinal direction are laminated on the groups of cogs, so that the belt can be readily pulled out of the pulley and the noise is reduced when the belt is run at a high speed. Thus, the V-belt, according to the invention, has a number of merits.

Now, a method of manufacturing, according to a reverse molding method, an adjustless V-belt having groups of cogs on the upper and lower surfaces thereof and rope tensile members regularly arranged, will be described with reference to FIGS. 11 and 12.

Figure 11:
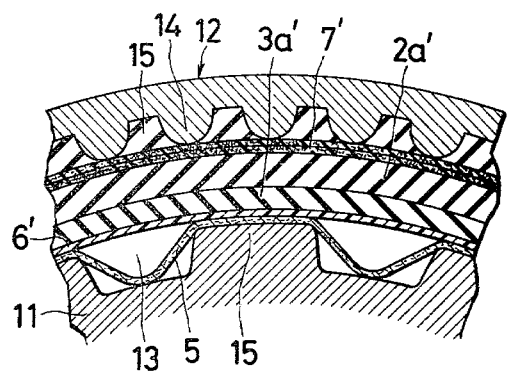
FIGS. 11 and 12 are sectional views for a description of the steps of manufacturing the adjustless V-belt according to the invention.
Figure 12:
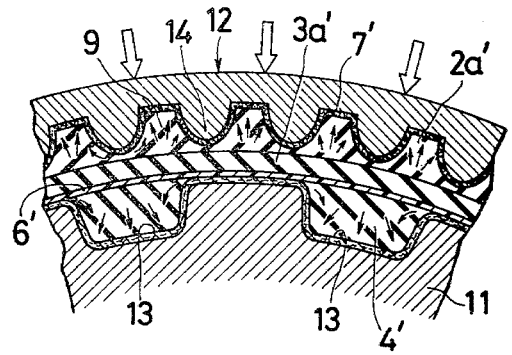

As shown in FIG. 11, strip-shaped protrusions 15 and grooves 13 between the protrusions 15 are alternately formed on the outer wall of a cylindrical metal wall 11. A cover canvas 5 which is obtained by weaving curled nylon warps $5a$ subjected to woolly treatment and ordinary nylon wefts $5b$ as shown in FIG. 6. After bonding treatment, it is made frictional with CR rubber or NBR rubber, or a heatproof synthetic rubber obtained by blending these rubbers, or a bend rubber such as NR-SBR rubber or CR-BR rubber, and is wound around the metal mold 11 in such a manner that the warps $5a$ are substantially perpendicular to the axis of the metal mold 11. If necessary, the cover canvas 5 is wound around the metal mold 11 with slack so that it can follow the grooves 13 of the metal mold 11. However, in the case where the above-described stretchable canvas high in stretchability is employed, it may be wound on the metal mold to the length equal to the outer circumference thereof without allowing it to follow the grooves of the metal mold.

Figure 14:
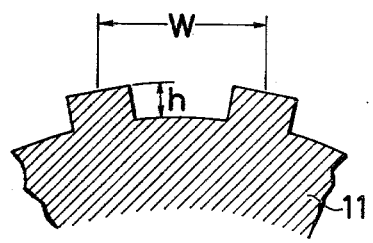
FIG. 14 is a cross-sectional view of a metal mold showing the height (h) and pitch (w) of the protrusions.

The protrusions of the metal mold 11 correlate to the pitch and depth of the cogs 4' of the belt. The pitch (w) and height (h) of the protrusions 15 are defined as follows: (see FIG. 14)

$1.5h < w < 3.5h$
$0.12d < h < 0.4d$ where, d is the thickness of the belt.

Then, a rope tensile member 6' made of polyester fiber or polyamide fibers 0.6 to 2.5 mm in diameter with a surface subjected to adhesion treatment with an isocyanate group liquid or RFL liquid and is heat-set at 200° C. so that the tensile member has a thermal contraction characteristic of at least $\Delta E_{100-20} = 3.5$ g/denier, the difference between the thermal contraction stress at 100° C. and that at 20° C., is spirally wound on the cover canvas with a tension 1.5 to 3.5 times the ordinary tension 0.2–0.6g/denier. Hence, when heat is generated in the belt, the thermal contraction stress is sufficient.

Thereafter, an adhesion rubber sheet 3a', not yet vulcanized made of a heatproof rubber of CR rubber or NBR rubber or of the blend of these rubbers, or a cold-proof rubber of a blend rubber such as NR-SBR rubber or CR-BR rubber is bonded to the entire lower surface of the tensile member 6'. The cogs 4' of the belt 1 are formed by using a sufficient amount of such rubber. Then, a compressive rubber sheet 2a' made of a heatproof synthetic rubber or a cold-proof rubber similar to the material of the adhesion rubber layer 3a' described above, is wound on the adhesion rubber layer. The adhesion rubber layer forms the essential rubber part of the belt, and therefore its thickness is larger than that of the adhesion rubber sheet 3a'.

In order to improve the side pressure durability and the wear resistance, a rubber sheet is used. It is obtained by mixing 10 to 30 parts by weight of various short fibers arranged laterally with 100 parts by weight of rubber and by subjecting the mixture to sheeting with, for instance, a calender is used as the compressive rubber layer. Finally, the rubber sheet is covered with two to five plys of a rubberized bias cotton canvas made frictional with rubber similar in quality to that material of the adhesion rubber 3a' or the compressive rubber 2a', or with two to five plys of a stretchable rubberized canvas 7' using curled nylon wraps subjected to woolly treatment such as shown in FIG. 6. Thus, the molding of the belt blank has been completed. The step of wrapping with thhe rubberized canvas 7' is unnecessary for a V-belt which, as shown in FIG. 7 has no rubberized canvas on the lower surface of the belt.

Figure 15:
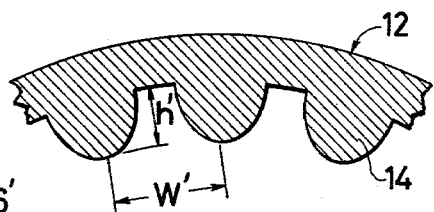
FIG. 15 is a cross sectional view of a mold showing the height (h') and pitch (w') of the protrusions.

The belt blank, thus molded, is sent to a vulcanizing process to be vulcanized. In the case of the belt shown in FIG. 11, the cover canvas 5 is wound around the metal mold 11 in such a manner that it follows the grooves 13 of the metal mold 11. As a result, triangular gaps are formed between the tensile member 6' and the canvas 5. (When a stretchable canvas high in stretchability is used as the cover canvas 5, it is unnecessary to provide such triangular gaps.) Then, a cylindrical mold 12 made of hard rubber is placed over the molded belt. The cylindrical mold 12 has number of semicircular or wave-shaped protrusions 14 formed on the inner wall, to form the cogs 9 on the lower surface of the belt. Since the protrusions 14 correspond to the cogs 9, the pitch (w') and height (h') of the protrusions 14 should be defined with respect to the thickness (d') of the belt as follows: (see FIG. 15)

$1.5h' < w' < 3.5h'$
$0.25d' < h' < 0.5d'$

The pitch (w') of the protrusions 14 may be constant or variable (random) within the above-described ranges.

The molded belt blank with the mold 12 is placed in a vulcanizing furnace, and steam under a pressure of 7 to 8 Kg/cm² is introduced in the furnace for vulcanization. In this operation, with the steam at high temperature and under high pressure the mold 12 with the protrusions is heated and pressurized. Therefore, as shown in FIG. 12, the internal rubber sheets 3a' and 2a' become fluid. The adhesion rubber sheet 3a in direct contact with the tensile member 6 is especially caused to flow between the tensile member 6' in the directions of the arrows by the external depression force into the grooves 13, while inflating the cover canvas 5, to thereby form the cogs 4' on the upper surface of the belt.

Figure 1:
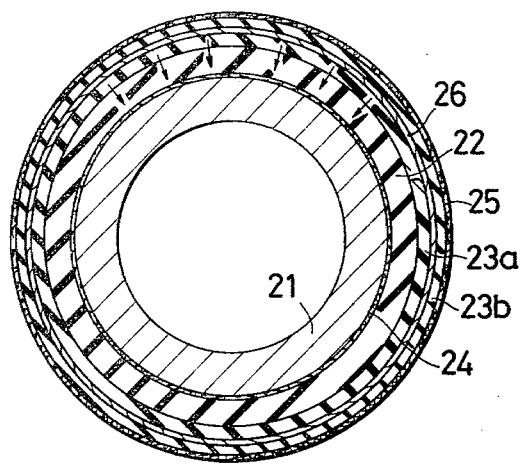
FIG. 1 is a sectional view for a description of a conventional method of manufacturing a V-belt.
Figure 2:
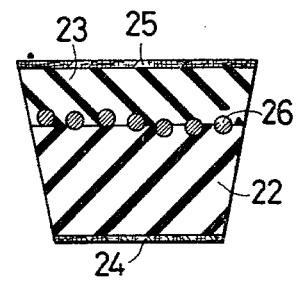
FIG. 2 is a sectional view of a V-belt manufacturing according to the conventional method described with reference to FIG. 1.
Figure 3:
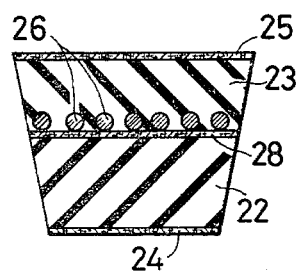
FIG. 3 is a sectional view showing one example of a modification of the conventional V-belt.
Figure 4:
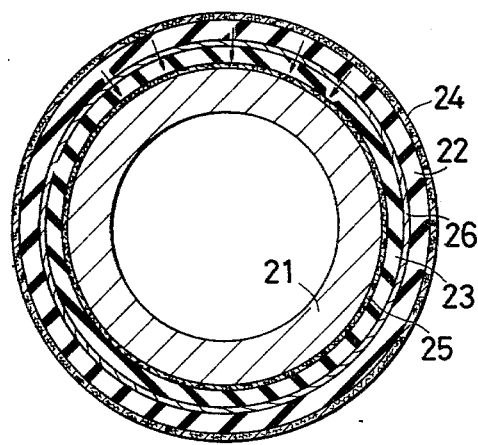
FIG. 4 is a sectional view for a description of another conventional method of manufacturing a V-belt.
Figure 5:
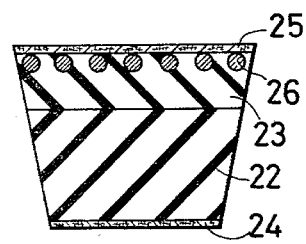
FIG. 5 is a sectional view of a V-belt manufacturing according to the method described with reference to FIG. 4.

On the other hand, the compressive rubber layer 2a' flows in the directions of the arrows to fill the grooves 15 of the mold 12 while depressing the rubberized canvas 7', to thereby form the cogs 9 on the lower surface of the belt. Thus, the molded belt blank with the cogs 4; and the cogs 9, respectively, on the upper surface and the lower surface has been completed. The amount of rubber allowed to flow between the tensile members 6' to form the cogs 4' is more than that in the case of the ordinary molding, as illustrated in FIG. 1, and so forth. The rubber flowing between the tensile members is in turbulent state as in the case of a kind of mixed rubber. As a result, the surface of the adhesion rubber sheet 3a' and the surfaces of the tensile members 6' are activated, and the adhesion power between the tensile members 6', the adhesion rubber layer 3' and the cogs 4' forming the belt body 1' is markedly increased.

In the method of manufacturing, a belt according to the invention, the tensile members 6 having a thermal contraction stress of at least $\Delta E_{100-20} = 3.5$g/denier are wound, with a tension 1.5 to 3.5 times the ordinary tension, on the nylon cover canvas 5 wound on the mold 11. However, since the tensile members 6' are held in place by the protrusions 15 previously described, the tensile members 6' are never dropped by the thermal contraction which is caused during the vulcanization. Therefore, the tensile members 6 are regularly arranged on the same cylindrical surface.

Figure 8:
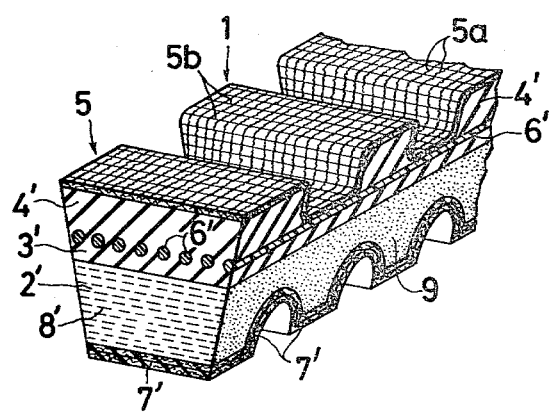

After vulcanization is complete, the mold 12 is removed to take the molded belt blank out of the mold 11. The molded belt blank extends perdendicular to the axis of the cylinder formed by the molded belt in a well known manner forming a plurality of rings having a predetermined width. The rings are turned inside out to provide a plurality of so-called "double cog type" adjustless V-belts having the cogs on the upper and lower surfaces, as shown in FIG. 8.

In the V-belt manufactured according to the invention utilizing the reverse molding, the rope tensile members having a thermal contraction characteristic of at least$\Delta E_{100-20} = 3.5$g/denier are wound directly on the thin nylon cover canvas having excellent stretchability which has been wound on the outer wall of the hard metal mold having the strip-shaped protrusions. Therefore, in the method according to the invention, unlike the conventional method, the tensile members are never dropped by thermal contraction which is caused during the vulcanization and are regularly arranged on the pitch line. Accordingly, if heat is generated in the belt by slip which may be caused during the run of the belt, all of the tensile members are induced to thermal contraction to contract the belt itself. Therefore, with the belt according to the invention, unlike the conventional belt, it is unnecessary to provide a tension pulley to adjust the tension of the belt or to adjust the distance between the axes of the pulleys. Thus, the service life of the belt is increased.

In molding the belt blank, rubber not yet vulcanized and high in viscosity is allowed to flow between the tensile members, and therefore the surface of the tensile members are activated. Furthermore, the rubber layer of cogs is interposed between the upper nylon cover canvas and the tensile members, and therefore no peeling phenomenon, which is one of the drawbacks accompanying the conventional method, is caused. Also, the adhesion power is markedly increased.

A group of cogs are formed at a uniform pitch or at a random pitch on the lower surface of the belt. Therefore, the bending characteristic of the belt is improved, and the belt can be used with a pulley of small diameter. The rubberized bias canvas or the stretchable canvas are bonded in lamination to the surface of the groups of cogs, and therefore the bending characteristic of the lower surface of the belt is markedly improved, and the slip between the belt and the pulley is improved. As a result, the belt can be readily pulled out of the pulley, and therefore the noise generated when the belt is run at high speed is reduced.

It is apparent that modifications of the invention are possible without departing from the essential scope thereof.

What is claimed is:

1. An adjustable V-belt, comprising: a compressive rubber layer; and adhesion rubber layer laminated on the upper surface of said compressive rubber layer; a group of first cogs protruding from said adhesion rubber, said first cogs having a predetermined depth and arranged at a predetermined pitch; a cover canvas covering said first cogs and roots between said first cogs; said cover canvas covering comprising an elastic canvas obtained by weaving curled nylon warps subjected to woolly treatment and ordinary wefts; whereby said cover canvas covering is elastic in one direction; rope tensile members embedded between said adhesion rubber layer and said group of first cogs with a regular pitch line in such a manner that said tensile members form substantially a cylinder and parts of said tensile members are in contact with said cover canvas, said rope tensile members having a thermal contraction stress of at least 3.5 g/denier which is the difference between a thermal contraction stress at 100° C. and that at room temperature; short fibers embedded laterally in said compressive rubber layer; a group of second cogs formed on the lower surface of said compressive rubber layer; and wherein the pitch and depth of said group of first cogs are defined by:

$1.5t < p < 3.5t$
$0.12d < t < 0.4d$, where:
p is the pitch of said group of first cogs,
t is the depth of said group of first cogs, and
d is the thickness of said V-belt.

2. An adjustless V-belt as in claim 1 wherein said cover canvas is elastic only in the longitudinal direction of said V-belt.

3. An adjustless V-belt as in claim 1, wherein said rope tensile members are of polyester fibers.

4. An adjustless V-belt as in claim 1 wherein said rope tensile members are of polyamide fibers.

5. An adjustless V-belt as in claim 1, wherein the Shore hardness of said adhesion rubber layer is in a range of 60° to 80°.

6. An adjustless V-belt as in claim 1, wherein said short fibers are embedded laterally in said compressive rubber layer at the mixing ratio of 10 to 30 parts by weight of said short fibers to 100 parts by weight of said compressive rubber layer.

7. An adjustless V-belt as in claim 1, wherein the pitch of said group of second cogs formed on the lower surface of said compressive rubber layer is constant.

8. An adjustless V-belt as in claim 1, wherein a rubberized canvas is bonded, in lamination, to said group of second cogs formed on the lower surface of said compressive rubber layer and is stretchable canvas which is obtained by weaving curled nylon warps subjected to woolly treatment and ordinary nylon wefts.

9. An adjustless V-belt as in claim 1 wherein said compressive rubber layer is a heatproof rubber.

10. An adjustless V-belt as in claim 1 wherein said compressive rubber layer is a coldproof rubber.

11. An adjustless V-belt as in claim 1, wherein the pitch of said group of second cogs formed on the lower surface of said compressive rubber layer is random.

12. An adjustless V-belt as in claims 7 or 11 wherein at least one ply of rubberized canvas is bonded to said groups of second cogs to cover said second groups.

13. An adjustless V-belt as in claims 1, 7 or 11, wherein the pitch and depth of said group of second cogs formed on the lower surface of said compressive rubber layer are defined by the following expressions:

$1.5t' < p' < 3.5t'$
$0.25d' < t' < 0.5d'$ where: p' is the pitch of said group of second cogs, t' is the depth of said group of second cogs, and d' is the thickness of said V-belt.

14. An adjustless V-belt as in claim 13 wherein at least one ply of rubberized canvas is bonded to said group of second cogs formed on the lower surface of said compressive rubber layer to cover said group of second cogs.

15. An adjustless V-belt as in claim 14, wherein said rubberized canvas is bonded, in lamination, to said group of second cogs and is formed on the lower surface of said compressive rubber layer and is bias canvas.

* * * * *